R. C. HULL.
ELECTRICAL SYSTEM OF DISTRIBUTION.
APPLICATION FILED OCT. 25, 1911.
1,084,741. Patented Jan. 20, 1914.
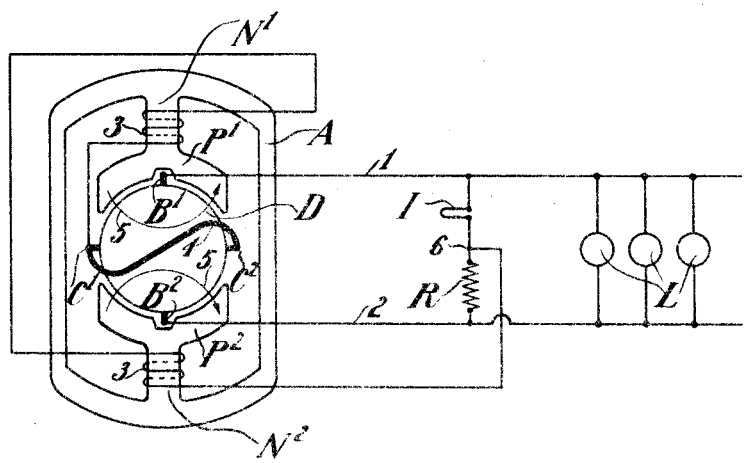
WITNESSES:
INVENTOR
Robert C. Hull
BY
Augustus B. Stoughton
ATTORNEY UNITED STATES PATENT OFFICE.

ROBERT C. HULL, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

ELECTRICAL SYSTEM OF DISTRIBUTION.

1,084,741.  Specification of Letters Patent.  Patented Jan. 20, 1914.

Application filed October 25, 1911. Serial No. 656,765.

*To all whom it may concern:*

Be it known that I, ROBERT C. HULL, a citizen of the United States, and a resident of Philadelphia, in the county of Philadelphia and State of Pennsylvania, have invented certain new and useful Improvements in Electrical Systems of Distribution, of which the following is a specification.

My invention relates to systems in which a variable speed dynamo is connected to a circuit requiring substantially constant potential, and the object of my invention is to provide simple, inexpensive and efficient means for controlling the field excitation of the dynamo to give substantially constant potential at its terminals, regardless of changes of speed.

In my Patent No. 1,014,395 of January 9th, 1912, I have shown a dynamo of the reaction type, whose field excitation is controlled by a winding connected across opposite points of a Wheatstone bridge whose branches contain resistances of different temperature characteristics. In the present invention, I provide a somewhat simpler arrangement of circuits to produce substantially the same results. Instead of a Wheatstone bridge connected across the consumption circuit, I employ a single branch circuit containing a resistance of high temperature coefficient, and a resistance of substantially zero temperature coefficient connected in series. The field winding of the dynamo is connected into a circuit extending from a point between these two resistances to a point in the short-circuit connection of the dynamo.

My invention will be more clearly understood by reference to the following description taken in connection with the accompanying drawing, in which—

A is the field frame of a dynamo of the reaction type and D is its armature. Two pole shoes P¹ and P² are shown connected to the field frame by the pole necks N¹ and N². The field winding 3 is wound on these two necks, so that current in this winding produces a primary field flux across the armature, and an electro-motive-force between the brushes C¹ and C². These brushes are short-circuited by a conductor of low resistance 4, and a small electro-motive force between the brushes C¹ and C² will thus produce a considerable flow of current through conductor 4, and in the windings of the armature. This current in the armature windings will produce a secondary field flux in the direction of the arrows 5, thereby producing an electro-motive-force across the principal brushes B¹ and B², which are connected to the consumption circuit 1—2, which supplies the translating devices L. Across the consumption circuit 1—2 is connected a branch circuit containing a resistance I of high temperature coefficient, such as the well known iron wire ballasts, and a resistance R whose temperature coefficient should be approximately zero, or may even be negative. The field winding 3 of the dynamo is connected at one end to a point ,6 between the resistance I and the resistance R, and at the other end to the short circuit connection 4.

It will be seen that the potential of the conductor 4 will always be substantially half-way between the potentials of conductors 1—2, and any point on the conductor 4 constitutes a third terminal for the machine, the other two terminals being the main brushes B¹ and B². The characteristics of the resistance I may be such that it will transmit a substantially constant current with wide variations of applied voltage on either side of some critical value, which value in this case should be chosen at one-half the desired maximum voltage across the conductor 1—2. The resistance R should be so designed that with a flow of current equal to the constant current maintained by resistance I, the drop of potential across its terminals will be just half of the desired maximum voltage across the conductors. At this maximum or limiting voltage, the potential of the point 6 will, therefore, be just half way between that of conductors 1 and 2, and there will be no flow of current in field winding 3. At all lower potentials across the conductors 1—2, the potential of point 6 will be higher than the potential of conductor 4, and current will flow in the field winding 3 to give the desired excitation for the dynamo. At a certain minimum operating speed of the dynamo, the design of the apparatus may be such that the potential across the conductors 1—2 necessary to give the required exciting current in the field winding 3, will be only slightly below the maximum limiting potential. For all speeds above this, however, the potential across the circuit 1—2 will be somewhere between this point and the maximum point, and if this difference of potential is sufficiently small, the dynamo will give a substantially constant potential for all speeds above the minimum operating speed above mentioned.

Having described my invention, what I claim and desire to secure by Letters Patent is—

1. A regulator for a three terminal dynamo electric machine comprising two resistances of different temperature coefficients connected to the extreme terminals of the dynamo, and a field winding for said dynamo connected between the two resistances, and to the intermediate terminal of said dynamo electric machine.

2. A regulator for a three terminal dynamo electric machine comprising two circuits of different conducting characteristics connected in series across the extreme terminals of the dynamo, and a field winding for said dynamo connected between the two circuits, and to the intermediate terminal of said dynamo electric machine.

3. In combination, a dynamo electric machine provided with principal brushes and auxiliary brushes adapted to provide a potential intermediate that of the principal brushes, a circuit connected across the principal brushes and containing resistances of different temperature coefficients, and a field coil for the dynamo connected intermediate of the resistances and to the auxiliary brushes.

4. In combination, a dynamo electric machine provided with principal brushes and auxiliary brushes adapted to provide a potential intermediate that of the principal brushes, a field coil for said dynamo connected at one end to the auxiliary brushes and branch circuits for connecting the other end of the field coil to the principal brushes respectively, said branch circuits containing devices adapted to change the relative potentials of the coil terminals with changes in the potential across the principal brushes.

In testimony whereof I have hereunto signed my name.

ROBERT C. HULL.

Witnesses:
J. LESTER WOODBRIDGE,
J. H. TRACY.